United States Patent [19]

Cahill et al.

[11] Patent Number: 5,028,463
[45] Date of Patent: Jul. 2, 1991

[54] MOLDED THERMOPLASTIC PARKING BLOCK WITH SLIDEABLY INTERENGAGED MEMBERS

[75] Inventors: Kenneth J. Cahill, West Jefferson; Leslie R. Hinzmann, Dublin; John E. Miller, Worthington; P. Douglas Shull, Galloway, all of Ohio

[73] Assignee: Philips Recycling, Inc., Cleveland, Ohio

[21] Appl. No.: 384,998

[22] Filed: Jul. 25, 1989

[51] Int. Cl.⁵ .................. B32B 1/06; E01F 15/00; E01C 11/22
[52] U.S. Cl. .................... 428/35.7; 428/76; 428/35.8; 428/36.9; 428/101; 428/137; 428/313.3; 428/313.9; 428/461; 428/500; 264/263; 264/271.1; 404/6; 404/7
[58] Field of Search ............ 428/76, 35.7, 35.8, 428/36.9, 101, 137, 313.3, 313.9, 461, 500; 264/263, 271.1, 279.9; 404/6, 7

[56] References Cited

U.S. PATENT DOCUMENTS

| | | | |
|---|---|---|---|
| 1,860,596 | 5/1932 | Reinhold | 264/271.1 X |
| 2,780,150 | 2/1957 | Yeoman | 264/271.1 X |
| 3,636,829 | 1/1972 | Palmer | 404/7 |
| 3,900,649 | 8/1975 | Hurt et al. | 428/101 X |
| 3,963,218 | 6/1976 | Gluesener | 404/6 X |
| 4,057,944 | 11/1977 | Wzatt, Jr. et al. | 428/71 X |
| 4,105,353 | 8/1878 | Bork et al. | 404/6 X |
| 4,714,377 | 12/1987 | Sandt et al. | 264/263 X |
| 4,762,438 | 9/1988 | Dewing | 404/6 |
| 4,844,652 | 7/1989 | Schroughan | 404/7 X |
| 4,927,678 | 5/1990 | Lallement | 428/36.9 |

FOREIGN PATENT DOCUMENTS 0142319 9/1982 Japan .................. 428/101

*Primary Examiner*—Ellis P. Robinson
*Assistant Examiner*—William P. Watkins, III
*Attorney, Agent, or Firm*—Mueller and Smith

[57] ABSTRACT

The present invention is directed to elongate rigid thermoplastic articles that are molded from thermoplastic material and which maintain their shape even at length-to-width ratios (i.e. aspect ratios) ranging from about 4:1 to about 15:1 or greater. The inventive elongate rigid thermoplastic articles comprise molded thermoplastic material having disposed interiorly therein along their longitudinal extent a system (e.g. a pair) of slideably interengaged members. Preferred slideably interengaged members comprise hollow pipes that are sleeved for slideable interengagement. In the molding of elongate rigid thermoplastic articles in accordance with the present invention, the interiorly disposed slideably interengaged members are acted upon by the shrinkage of the cooling thermoplastic material resulting in the members sliding into closer interengagement. Distortion of the cooled elongate thermoplastic articles is substantially suppressed thereby.

7 Claims, 3 Drawing Sheets

MOLDED THERMOPLASTIC PARKING BLOCK WITH SLIDEABLY INTERENGAGED MEMBERS

BACKGROUND OF THE INVENTION

The present invention relates to molded thermoplastic articles and more particularly to elongate molded thermoplastic articles which have been strenghtened to prevent distortion when the articles are subjected to thermal stresses, e.g. when the articles cool in the mold and/or during usage.

A wide variety of products can be molded from thermoplastic material. When the articles are small or dimensionally the same in length and width, relatively uniform shrinkage of the thermoplastic material occurs when the article is cooling in the mold. For elongate objects (that is objects having a length to width ratio of greater than about 4:1), molded thermoplastic articles often can become distorted when the article cools in the mold and the thermoplastic material shrinks. This is particularly true when, for example, parking blocks are being formed from thermoplastic material. Parking blocks can range in length from about three feet to eight feet or greater with widths of much less than one foot. When such molded articles cool in the mold, the parking blocks have a tendency to bend and twist.

The difference in modulus between plastic and metal militate against use of rebar or similar reinforcement in such elongate molded articles. Thus, the manufacturer is faced with the difficult task of maintaining the shape and dimensional tolerances of the molded article without adversely impacting weight and cost considerations.

BROAD STATEMENT OF THE INVENTION

The present invention is directed to elongate rigid thermoplastic articles that are molded from thermoplastic material and which maintain their shape even at length-to-width ratios (i.e. aspect ratios) ranging from about 4:1 to about 15:1 or greater. The inventive elongate rigid thermoplastic articles comprise molded thermoplastic material having disposed interiorly therein along their longitudinal extent a system (e.g. two or more) of slideably interengaged members. Preferred slideably interengaged members comprise hollow pipes that are sleeved for slideable interengagement. In the molding of elongate rigid thermoplastic articles in accordance with the present invention, the interiorly disposed slideably interengaged members are acted upon by the shrinkage of the cooling thermoplastic material resulting in the members sliding into closer interengagement. Distortion of the cooled elongate thermoplastic articles is substantially suppressed thereby.

Advantages of the present invention include the ability to mold distortion-free elongate thermoplastic articles. Another advantage is that less thermoplastic material is used, thus reducing cost. A further advantage is the ability to utilize hollow members, thus also reducing the weight of the molded elongate thermoplastic articles. Yet another advantage is that the inventive thermoplastic articles are much stiffer by dint of the slideably interengaged members being disposed interiorly therein. These and other advantages will be readily apparent to those skilled in the art based upon the disclosure set forth herein.

The drawings will be described in detail in connection with the following description.

DETAILED DESCRIPTION OF THE INVENTION

The shrinkage of the molded thermoplastic following the molding operation distorts elongate articles. In use, thermoplastic articles subjected to thermal cycling also can evidence warpage and breakage due to the thermal expansion and contraction. The greater the ratio of length-to-width, the greater the frequency of warpage and breakage of such articles. Thus, the ability to suppress warpage and breakage due to thermal effects is a breakthrough in the manufacture of elongate thermoplastic articles. Fortuitously, the solution disclosed herein also results in articles that are much more rigid by virtue of the interiorly disposed slideably engaged members, than are substantially equivalent articles manufactured from only thermoplastic material. Such increased strength can be beneficial when the articles are molded into structural parts such as, for example, parking blocks, fence posts, curbs, speed bumps, and like articles. It is theorized that the compressive forces exerted during cooling of the thermoplastic articles during thermal cycling is taken up by the slideably interengaged members, thus relieving the strain put on the article thereby.

Figure 1:
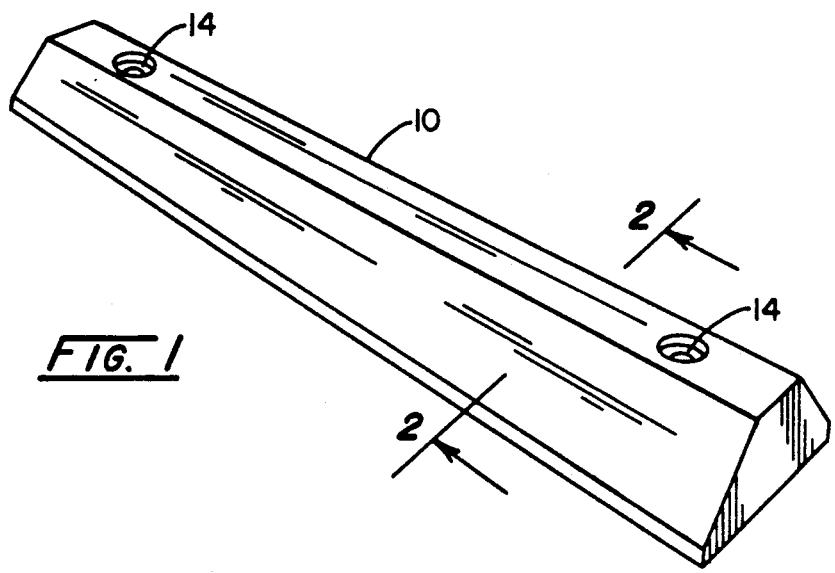
FIG. 1 is a perspective elevational view of the novel elongate rigid thermoplastic article molded for use as a parking block.

Referring to FIG. 1, a parking block or stop configuration of the novel thermoplastic article is set forth. It will be observed that parking block 10 is elongate in configuration, that is, it has a length-to-width ratio of at least about 4:1. Conventional parking blocks often have ratios ranging up to about 15:1 or greater. It will be observed that parking block 10 can be fastened to a parking lot, for example, by bolts (not fully shown in FIG. 1) that penetrate through holes 12 and 14 that have been drilled through parking block 10. It should be understood that bolt hole failure due to shear forces applied to parking block 10 tend to be the normal mode of failure exhibited by parking blocks utilizing holes and bolts for attachment. The increased strength realized by the novel thermoplastic articles is measured by supporting parking block 10 at either end while applying a force to the center.

Figure 2:
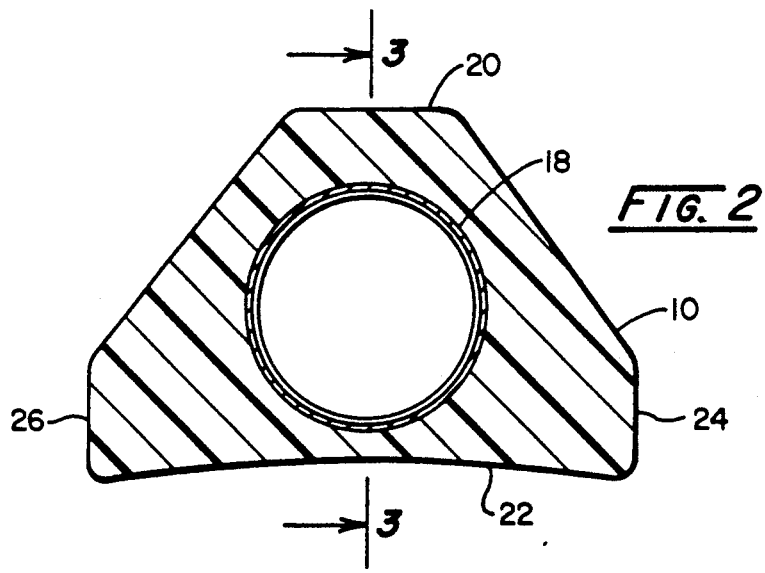
FIG. 2 is a cross-sectional elevational view taken along line 2—2 of FIG. 1.
Figure 3:
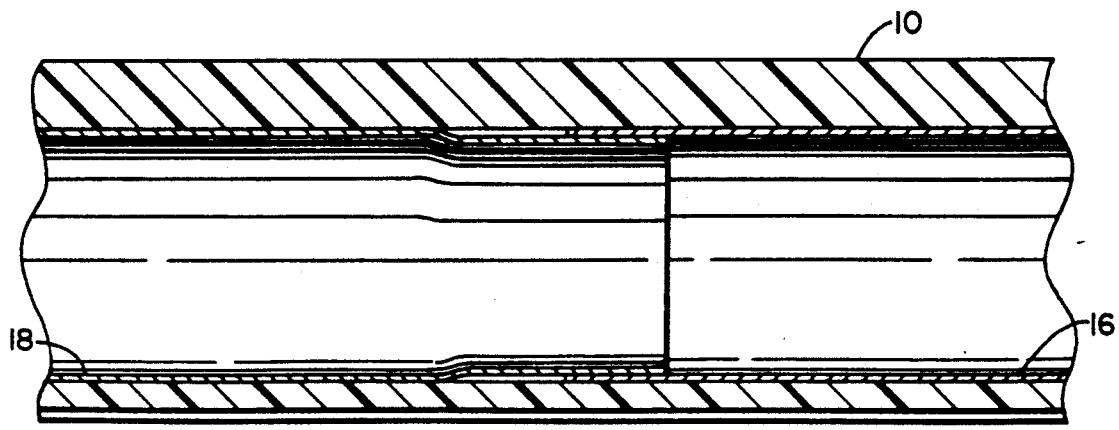
FIG. 3 is a cross-sectional elevational view taken along line 3—3 of FIG. 2.

Referring to FIGS. 2 and 3, it will be observed that parking block 10 has interiorly disposed therein along its longitudinal extent pipe member 16 and pipe member 18. It will be observed by reference to FIG. 3 that pipe members 16 and 18 are sleeved at their ends for slideable interengagement. Thus, as parking block 10 expands and contracts due to thermal influences, pipe members 16 and 18 also can slide relative to each other in order to accept the forces transmitted by the thermoplastic material forming parking block 10. Of course, more than two members could be slideably interengaged and/or multiple sets of members could be used.

For efficiency and economy, slideably interengaged members 16 and 18 preferably are hollow and circular in shape. Galvanized steel stovepipe represents a preferred member for use in manufacturing parking blocks. It will be appreciated, however, that the configuration of members 16 and 18 could be square, hexagonal, octagonal, or other shape as is necessary, desirable or convenient, providing that the slideable interengagement feature is retained. Also, members 16 and 18 need not be hollow, but could be solid also. For cost and weight considerations, however, hollow members distincly are preferred. Also, while galvanized steel pipe currently is preferred, it will be appreciated that any material that does not undesirably interact with the thermoplastic material utilized in forming block 10 nor is subject to thermal degradation, is suitable for use in forming members 16 and 18. While corrosion-resistance is desirable for many exterior uses of the novel thermoplastic articles, when corrosion resistance is not necessary, mild steel or other metal may be used in forming members 16 and 18. For that matter, members 16 and 18 suitably may be manufactured from thermoplastic or thermoset material that does not warp or melt when subjected to the temperatures required for molding the thermoplastic article.

With respect to the improved rigidity referred to above, a parking block having dimensions (reference FIG. 2) of 2 inches for side 20, 7 inches for side 22, 1½ inches for sides 24 and 26, and having a vertical height from side 20 to side 22 of five inches, utilizing a galvanized steel stovepipe having a three inch diameter and 0.013 inch wall thickness, results in a block that is about six times more rigid than an equivalent block manufactured from only thermoplastic material (polyethylene).

Figure 4:
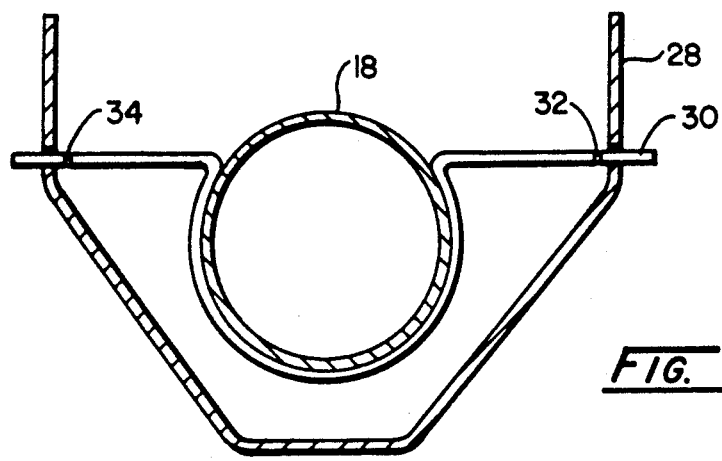
FIG. 4 is a cross-sectional elevational view of a mold and holder assembly retaining one of the slideably interengaged members.
Figure 5:
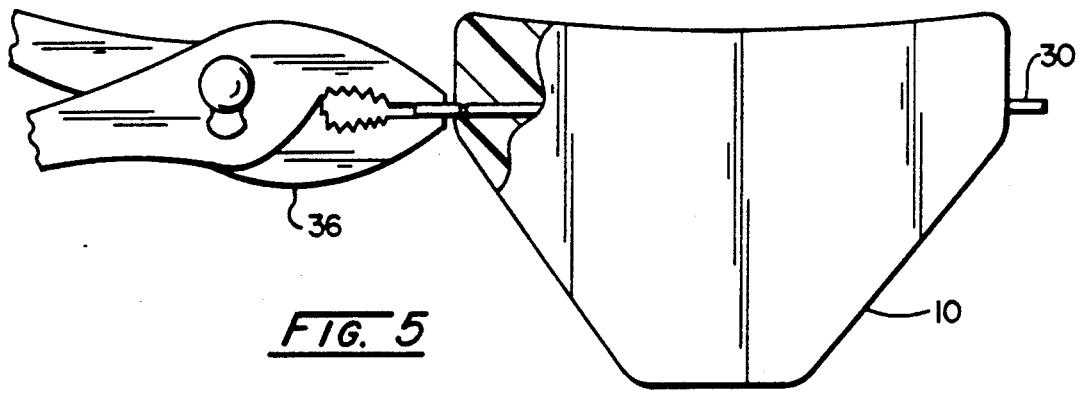
FIG. 5 is an end view of the parking block of FIG. 1 with partial cutaway showing removal of the holding bracket depicted at FIG. 4.

It will be appreciated that during the molding operation, location of members 16 and 18 is important, since sufficient material should be present between such members and the outer wall of the molded article. Thus, several fixtures were devised for holding pipe members 16 and 18 in place during the molding operation. With reference to FIGS. 4 and 5, it will be observed that pipe member 18 is shown disposed within the cavity formed by mold 28. Holding pipe 18 in position is bracket 30. The bracket needs to prevent pipe 18 from floating to the upper surface of the thermoplastic material that fills mold 28. The spring-like action created by the design of bracket 30 accomplishes this hold-down feature. It will be observed that bracket 30 has notches 32 and 34 located just short of the outer walls of the parking block that is formed from mold 28. Referring to FIG. 5, it will be observed that parking block 10 molded in mold 28 has the outer ends of bracket 30 penetrating through the outer walls. Notches 32 and 34 permit workers to utilize pliers 36 or other similar hand tool for grasping the ends of bracket 30 and breaking the bracket at notches 32 and 34. This results in a parking block that does not have the ends of 30 penetrating therethrough which would present a danger to workers and objects coming in contact with parking block 10. Also, parking block 10 manufactured in accordance with FIG. 4 still requires holes 12 and 14 to be drilled therethrough for use of bolts, for example, for holding the parking block down to a parking lot.

Figure 6:
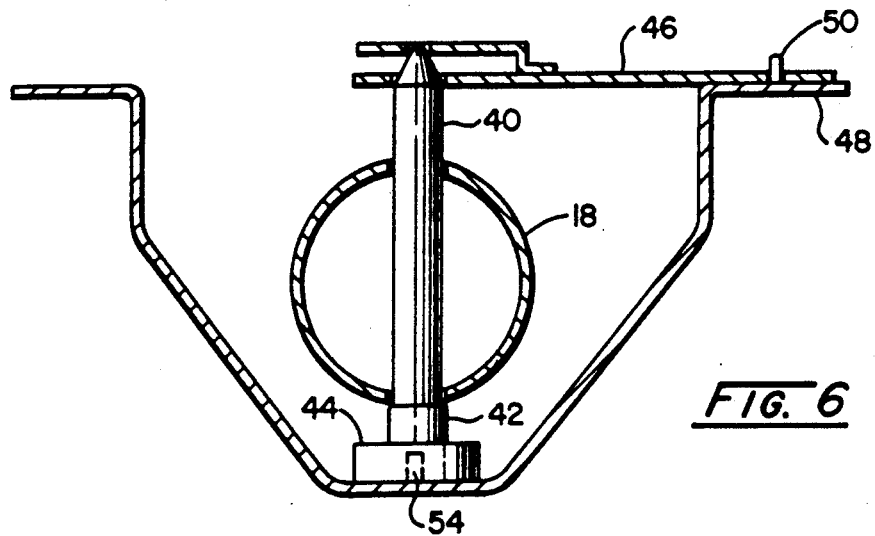
FIG. 6 is a cross-sectional view of an alternative mounting assembly for the slideably interengaged members in a mold.
Figure 7:
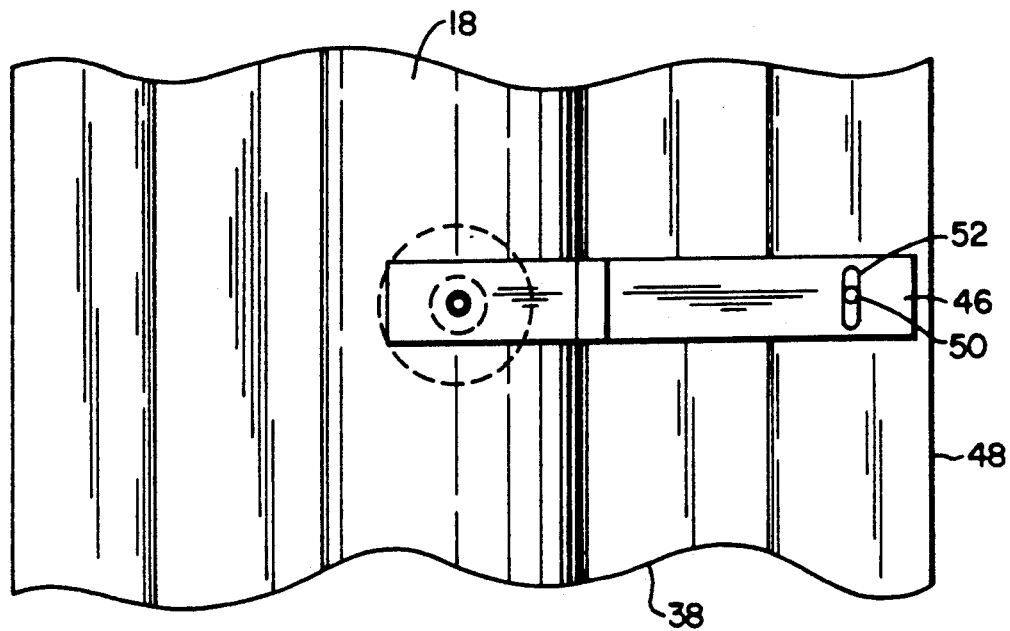
FIG. 7 is a partial overhead elevational view of the hold-down bracket mold and pipe depicted at FIG. 6.
Figure 8:
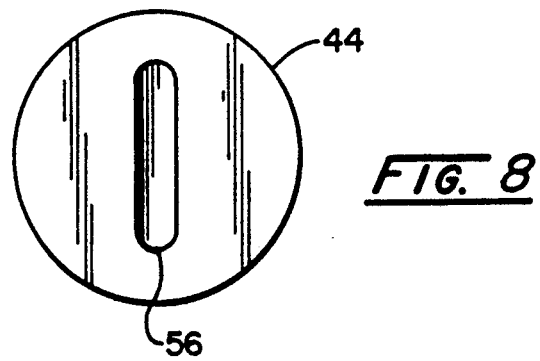
FIG. 8 is a plan view of the head of the alignment pin depicted at FIG. 6.

Thus, it would be desirable to devise a fixture that would both locate and retain members 16 and 18 in a proper position within mold 28 and simultaneously mold the holes through the article and sleeved members. One such fixture is depicted at FIGS. 6–8. Referring to FIG. 6, it will be observed that mold 38 has sleeved member 18 retained therein by pin 40 which penetrates also through sleeved member 18 (and sleeved member 16 not shown). Pin 40 has collar 42 that serves as a pipe stop for locating member 18. The counter sink required in the parking block is provided by head 44 of pin 40. Pin 40 is retained against the bottom of mold 38 by bracket 46. Referring to FIGS. 6 and 7, it will be observed that horizontal lip 48 of mold 38 has upwardly-standing pin 50 through which slot 52 in bracket 46 fits. The other end of bracket 46 fits over pin 40 for holding it down. Also, the bottom of mold 38 retains upstanding pin 54 which fits into slot 56 (see FIG. 8) machined into head 44 of pin 40. Slots 52 and 56 permit members 16 and 18 to move along the longitudinal axis of the parking block being molded during the cooling of the molten thermoplastic material and are guided in this movement by slots 52 and 56 for maintaining the location of pin 40 and member 18. The block when demolded then can have pin 40 removed, resulting in a parking block that already bears the hole for receiving a hold-down bolt. Significant labor savings result by this feature. It will be appreciated that a variety of additional configurations of brackets can be designed for locating sleeved members 16 and 18 and for in-molding bolt holes therein.

With respect to the thermoplastic material utilized in forming the novel articles, it will be appreciated that a variety of thermoplastic copolymers, homopolymers, and alloys or blends thereof may be utilized as is necessary, desirable, or convenient. For economy, preferred thermoplastic materials include low density polyethylene, linear low density polyethylene, high density polyethylene/polypropylene blends, polyvinyl chloride, and the like. There is virtually no limit to the types of thermoplastic material that can be molded in accordance with the precepts of the present invention. Also, a variety of tinctorial and/or opacifying pigments and/or fillers may be incorporated into the thermoplastic material. For that matter, additives controlling the rheology of the thermoplastic material, lubricants, and other additives may be used as is necessary, desirable, or convenient in conventional fashion.

Since certain changes may be made in the above invention without departing from the scope of the invention herein disclosed, it is intended that all matter contained in the above description or shown in the accompanying drawings shall be interpreted as illustrative and not in a limiting sense.

We claim:

1. A distortion-free molded elongate thermoplastic parking block having a longitudinal extent and a crosswise extent wherein the ratio of said longitudinal extent to said crosswise extent ranges from between about 4:1 to about 15:1 and comprising molded thermoplastic material having disposed interiorly therein along its longitudinal extent a system of slidably interengaged members wherein said members are rigid, resistant to thermal degradation, warp resistant, melt resistant, and non-reactive with said thermoplastic material.

2. The parking block of claim 1 wherein said interengaged members are hollow.

3. The parking block of claim 2 wherein said hollow members are manufactured from metal.

4. The parking block of claim 1 wherein said interengaged members are cylindrical in configuration.

5. The parking block of claim 1 in a configuration suitable for a parking block wherein said article additionally has at least two holes penetrating therethrough which are adapted to receive hold-down bolts.

6. The parking block of claim 1 wherein said thermoplastic material is a polyethylene or a blend of polyethylene and polypropylene.

7. The parking block of claim 1 which has two of said members which are slideably interengaged.

* * * * *